Aug. 21, 1945.  L. F. BEACH ET AL  2,382,967
GYRO ROTOR AND MOUNTING STRUCTURE
Original Filed Feb. 20, 1942

INVENTORS
L. F. BEACH
O. E. ESVAL
BY A. W. LANE
ATTORNEY.

Patented Aug. 21, 1945

2,382,967

UNITED STATES PATENT OFFICE 2,382,967

GYRO ROTOR AND MOUNTING STRUCTURE

Lennox F. Beach, Merrick, Orland E. Esval, Huntington, and Arthur W. Lane, Freeport, N. Y., assignors to Sperry Gyroscope Company, Inc., Brooklyn, N. Y., a corporation of New York Original application February 20, 1942, Serial No. 431,704. Divided and this application September 22, 1942, Serial No. 459,338

6 Claims. (Cl. 172—36)

This invention generally relates to gyroscopic rotors and the mounting therefor. More particularly, the present invention is directed to the novel subject matter in this connection divided from our copending application Serial No. 431,704, filed February 20, 1942, for Directional gyroscopes.

Figure 1:
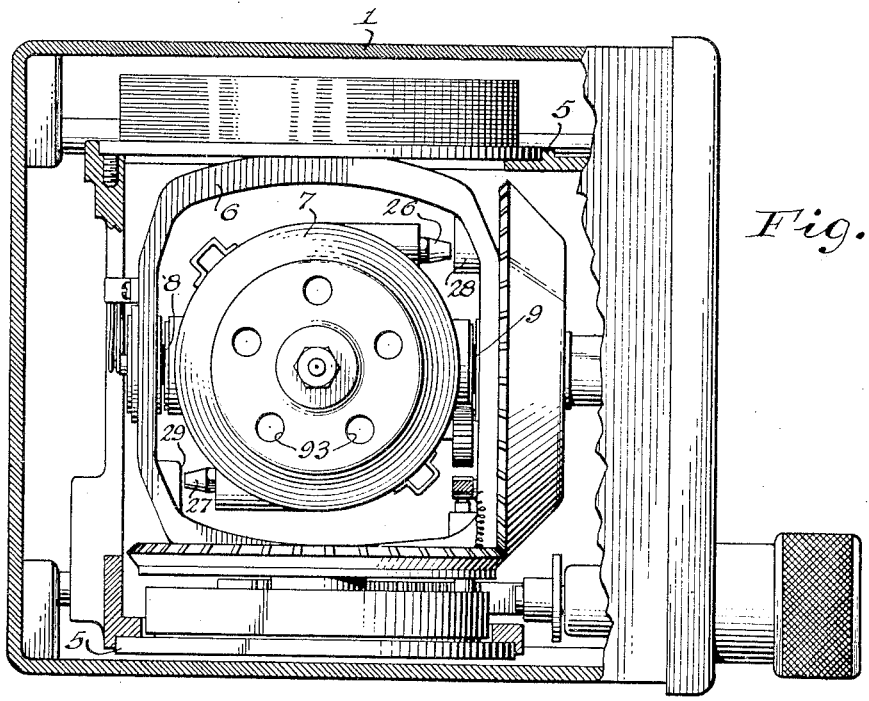
Figure 2:
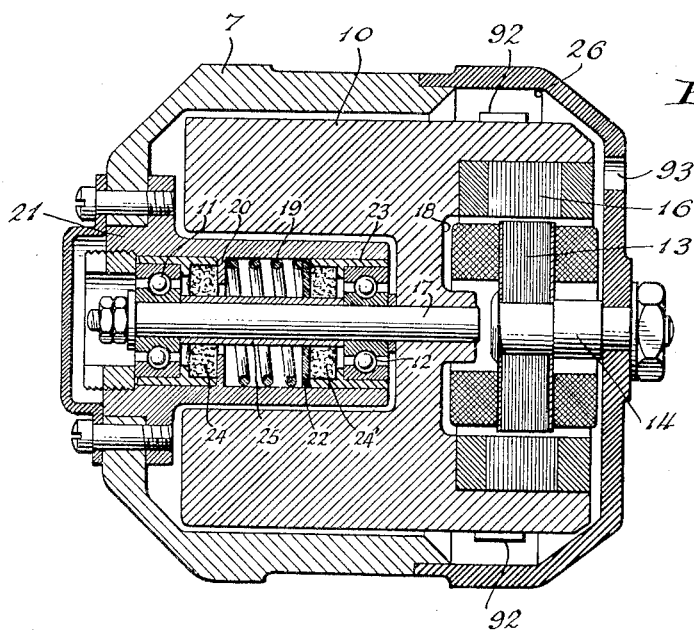

The novel features and details of the invention will be apparent from the following description when read in relation with the accompanying drawing, wherein Fig. 1 is a vertical section of a directional gyro instrument constructed in accordance with the present invention, and Fig. 2 is an enlarged vertical section of the gyro rotor bearing frame or case of the instrument shown in Fig. 1.

The instrument in which this invention is embodied for illustrative purposes is shown in the drawing as an electrically spun directional gyroscope of the type which may or may not be slaved to or controlled from a remote magnetic compass. The gyro instrument shown includes an outer casing having an interior shock absorbing frame 5 fixedly mounted therein. The upper and lower portions of the frame 5 carry suitable aligned bearings which receive the trunnions of a vertical ring 6 and mount the same for movement about a vertical axis within the casing in a conventional manner. The rotor bearing frame or case 7 of the gyro instrument is pivotally supported on the ring 6 by means of suitable bearings in the oppositely disposed arms of the ring and by the horizontally extending trunnions 8 and 9. The axes of the case 7 and ring 6 are consequently mutually perpendicular. With particular reference to Fig. 2, the gyro rotor 10 of instrument is rotatably mounted within the frame or case 7 in accordance with the teaching of the present invention by means of the spaced bearings 11 and 12. The spin axis of the gyro rotor is normally disposed at right angles to both the vertical axis of the ring 6 and the horizontal axis of the case 7.

In the present instance, the gyro rotor is spun by means of a suitable polyphase motor which is supplied with energy from a source of alternating current energy (not shown). Energy from the source is led to the motor by way of specially constructed current conducting trunnion pivots for the gyro instrument which are particularly described in our hereinbefore noted parent application. The wound stator 13 of the gyro rotor spinning motor is fixedly supported on a stub shaft 14 which projects inwardly from one end of the case 7. The rotor 16 of this motor is preferably of the squirrel cage type and is located in the interior of one of the open ends of the gyro rotor or flywheel 10. The gyro rotor 10 is shown as being connected to the rotor shaft 17 through an intermediate web 18. The gyro rotor has long overhang on both sides of the web 18, the overhang being preferably longer on the side opposite the stator 13 so that the center of gravity of the rotor may be situated at a point between the bearings by which it is mounted on shaft 17. Preferably, the rotor shaft 17 extends only in one direction from the web 18 so that both the gyro rotor bearings 11 and 12 are on the same side of the web, thus eliminating any bearings on the side of the gyro rotor adjacent the motor.

Axial movement of the rotor within the case 7 is prevented by a spring 19, one end of which bears against an internal flange 20 on an inwardly extending, tubular-shaped, mounting piece 21 which is fixed in position on the case 7, in a suitable manner. A sleeve 25 spaces the interior races of both anti-friction bearings 11 and 12, the races being fixed in a longitudinal position along the shaft 17 between an internal fixed collar and the washer and lock nut construction provided at the threaded end of the shaft 17. The opposite end of the spring 19 is shown as pressing against a washer 22 which bears against a movable sleeve 23 in which the outer race of bearing 12 is mounted. The outer race of bearing 11 is mounted on a similar sleeve which is fixed in position between flange 20 and a suitable lock nut in the mounting piece 21 which engages one side of the race. Lubrication of the bearings is shown as provided by oil packing rings 24 and 24'.

The thrust of spring 19 against the outer race of the bearing 12 is communicated through the ball bearings to the shaft 17, by way of the inner race, the same tending to move the shaft towards the right as viewed in Fig. 2. Such movement in this direction as is permitted by looseness in the bearing parts is communicated to bearing 11 which is likewise affected but in a reverse manner. Bearing 12 consequently serves as a locating bearing which positions shaft 17 so that it, as well as the rotor 10 which is mounted thereon, is maintained free from movement in an axial direction within the bearing case 7.

In order to obtain smooth operation of the gyro-rotor the improved case rotor mounting structure provided locates the center of gravity of the rotor 10 between the spaced bearings 11 and 12, the same being situated, in the present instance, slightly to the left, as viewed in Fig. 2, of the bearing 12.

The gyroscope is shown as pneumatically leveled by means of air jets which issue from the tangentially directed nozzles 26 and 27 mounted on the rotor bearing case, Fig. 1. The jets are directed against vertical knife edge baffles 28 and 29 on the vertical ring 6, said knife edges normally bisecting the jets from the nozzles when the rotor case is normally positioned. In the event of inclination of the case from a normal position, a torque is exerted by one of the jets around the vertical axis of the ring, which restores the case to its normal position.

The rotor 10 also serves as an air pump to supply air under pressure to the nozzles 26 and 27. Suitable blades or fins 92 are situated on a portion of the peripheral surface of the rotor 10 for this purpose, air being obtained for the pump through suitable ports 93 situated in the end of the case 7.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. An electrically driven gyro rotor and mounting structure comprising a gyro rotor having axially bored end portions providing respective openings therein one of which is longer than the other, a shaft forming a part of the gyro rotor coaxially situated within the longer opening therein, a motor having a rotor located within the shorter opening in the gyro rotor, a gyro rotor mounting frame, a bearing including member fixed to the mounting and extending within the longer opening in the gyro rotor for engaging the rotor shaft, and a wound stator for the motor fixed to the mounting, being arranged thereon in opposite relation to the bearing including member, and situated within the shorter opening in the gyro rotor in spaced relation to the motor rotor.

2. An electrically driven gyro rotor and mounting structure comprising a gyro rotor having peripheral overhang portions extending from opposite sides of a web which is located to one side of a central longitudinal position in the rotor, one of the thereby provided openings in the ends of the rotor being longer than the other, a shaft for the gyro rotor connected to the web and positioned only in the longer of the overhang provided openings in the rotor, a motor having a rotor mounted in the internal wall of the overhang provided shorter opening in the gyro rotor, a gyro rotor mounting frame having a member extending within the longer of the provided openings in the gyro rotor, spaced bearings for said rotor shaft contained on said inwardly extending member, and a wound stator for the motor fixed to the mounting frame and situated within the shorter of the provided openings in the gyro rotor in spaced relation to the motor rotor.

3. A gyro rotor and mounting structure as claimed in claim 1, in which the bearing including member provides two axially spaced bearings which engage the gyro rotor shaft and are so positioned with respect to the longer opening in the gyro rotor that the center of gravity of the gyro rotor is located between the same.

4. A gyro rotor and mounting structure as claimed in claim 1, in which the bearing including member provides two axially spaced ball bearings which engage the gyro rotor shaft, and means for preloading said ball bearings to confine the gyro rotor and shaft against axial movement with respect to the frame.

5. A gyro rotor and mounting structure comprising a gyro rotor having an axially bored end portion, a shaft forming a part of the gyro rotor coaxially situated within the opening formed in the end portion, a frame, a member fixed to the frame and extending within the opening formed in the end portion of the gyro rotor, and two spaced bearings carried by said member arranged thereon to engage said shaft and support said rotor with its center of gravity located between said bearings.

6. A gyro rotor and mounting structure comprising a gyro rotor having an axially bored end portion, a shaft forming a part of the rotor coaxially situated within the opening formed in the end portion, a gyro rotor mounting frame, and a bearing-including member fixed to the rotor frame and extending within the opening formed in the end portion of the rotor for rotatably engaging the rotor shaft, said last-named member providing a retaining means for the outer races of two spaced ball bearings, one of which is fixed and the other of which is movable, yielding means for positioning said movable race, and retaining means for locating the inner races of said bearings in spaced axial relationship on the shaft of the rotor.

LENNOX F. BEACH.
ORLAND E. ESVAL.
ARTHUR W. LANE.